United States Patent
Morioka et al.

(10) Patent No.: US 7,515,609 B2
(45) Date of Patent: Apr. 7, 2009

(54) WIRELESS COMMUNICATION SYSTEM, WIRELESS COMMUNICATION APPARATUS, WIRELESS COMMUNICATION METHOD, AND COMPUTER PROGRAM

(75) Inventors: Yuichi Morioka, Tokyo (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 11/368,435

(22) Filed: Mar. 7, 2006

(65) Prior Publication Data

US 2006/0209712 A1 Sep. 21, 2006

(30) Foreign Application Priority Data

Mar. 9, 2005 (JP) ............................... 2005-064864

(51) Int. Cl.
*H04J 3/16* (2006.01)
*G01R 31/08* (2006.01)
(52) U.S. Cl. ....................................... 370/468; 370/252
(58) Field of Classification Search ....................... None
See application file for complete search history.

(56) References Cited

U.S. PATENT DOCUMENTS

| | | | | |
|---|---|---|---|---|
| 7,274,652 | B1 * | 9/2007 | Webster et al. .............. | 370/204 |
| 2003/0152058 | A1 * | 8/2003 | Cimini et al. ............... | 370/338 |
| 2004/0047296 | A1 * | 3/2004 | Tzannes et al. ............. | 370/252 |
| 2005/0135318 | A1 * | 6/2005 | Walton et al. ............... | 370/338 |
| 2006/0165191 | A1 * | 7/2006 | Lin et al. .................... | 375/267 |
| 2006/0187964 | A1 * | 8/2006 | Li et al. ...................... | 370/474 |
| 2006/0280204 | A1 * | 12/2006 | Nagata et al. ............... | 370/473 |

FOREIGN PATENT DOCUMENTS

JP 2006-050526 2/2006

OTHER PUBLICATIONS http://www.802wirelessworld.com/index.jsp.

* cited by examiner

*Primary Examiner*—Wing F Chan
*Assistant Examiner*—Eunsook Choi
(74) *Attorney, Agent, or Firm*—Finnegan, Henderson, Garrett & Dunner, L.L.P.

(57) ABSTRACT

Disclosed is a wireless communication system with communication stations that make information transmission therebetween by selecting a proper transmission rate under a communication environment where plural transmission rates coexist. In order for a transmission station for transmitting a packet to determine a transmission rate for transmission of subsequent packets, the system includes a first mode of determining a transmission rate fed back from the reception station as its transmission rate, a second mode of determining a transmission station independently regardless of a feedback of a transmission rate from the reception station, and a third mode of determining a transmissions rate while considering the transmission rate fed back from the reception station. In the first mode, the reception station feeds back a transmission rate that should be used in the transmission of the subsequent packets and sets up a transmission stop duration of the peripheral stations based on the transmission rate being fed back. In the second mode, the reception station sets up a transmission stop duration based on the transmission rate specified by the transmission station. In the third mode, the receiving feeds back a transmission rate data that should be used to transmit the subsequent packets to the transmission station and sets up a transmission stop duration of peripheral stations based on the default transmission rate specified by the transmission station.

20 Claims, 9 Drawing Sheets

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application 2005-064864 filed in the Japanese Patent Office on Mar. 9, 2005, the entire contents of which being incorporated herein by reference.

BACKGROUND OF THE INVENTION

The present invention relates to a wireless communication system in which a plurality of radio stations perform communication mutually, such as a wireless LAN (Local Area Network) or PAP (Personal Area Network), a wireless communication apparatus, a wireless communication method, and a computer program therefor. Particularly, this invention relates to a wireless communication system in which each communication station performs random access based on carrier detection on a communication channel by the CSMA (Carrier Sense Multiple Access) method, a wireless communication apparatus, a wireless communication method, and a computer program therefor.

More specifically, this invention relates to a wireless communication system in which communication stations performs random access under the wireless-communications environment where a plurality of transmission rates are available, a wireless communication apparatus, a wireless communication method, and a computer program therefor, more specifically to a wireless communication system in which communication stations performing random access transmit information using a proper transmission rate between them; a wireless communication apparatus; a wireless communication method; and a computer program therefor.

Wireless networks which are alternative for the bothering cable wiring in the existing cable communications are brought to a lot of attention recently. Among standard specifications concerning the wireless network is IEEE (The Institute of Electrical and Electronics Engineers) 802.11 etc.

As a method whereby a communication station transmits information over a channel in a wireless network, there are bandwidth reservation transmission in which a bandwidth is secured in advance for a control station called "access point" or "coordinator," random access in which a communication station having generated transmission data starts transmission indiscriminately, and the like.

Note here that when a plurality of users (communication stations or terminals) try to make random access on the same communication channel, it is necessary to avoid contention. As a typical communication procedure therefor, the CSMA (Carrier Sense Multiple Access) system is known. The CSMA is a connection system of performing multiple access based on carrier detection. Since it is difficult to receive a signal transmitted by itself in wireless communication, a communication station checks absence of information transmission of another communication apparatus by the CSMA/CA (Collision Avoidance) system rather than the CSMA/CD (Collision Detection) system, and then starts to transmit information of its own, so that the contention of access is avoided.

Moreover, it is known that a problem of a hidden terminal occurs under a communication environment in which each communication station makes random access autonomously. The hidden terminal indicates a communication station that, in the case of performing communication among certain specific communication stations, is available for hearing from one communication station serving as another party of the communication but that is unavailable for hearing from another station. A communication station wishing to start information transmission is unable to negotiate with the hidden terminal, and accordingly there is the possibility that transmission operations may cause collision if only the CSMA/CA system is operated.

As a methodology for solving the hidden terminal problem, there is a system of executing handshake in which a communication station wishing to transmit information sends a transmission request packet prior to transmission start to a communication station acting as a receiving side, and the reception station sends back an acknowledgment notification packet to start the communication. As its representative example, the RTS (Request to Send)/CTS (Clear to Send) procedure can be mentioned. This procedure is also adopted in IEEE802.11.

In this system, the procedure shall be followed that a communication station that is a sender of data sends an RTS packet, a communication station that is a destination of the data sends back a CTS packet, and in response to reception of the CTS packet, the sender starts the data transmission. Then, when a hidden terminal received at least either of the RTS or the CTS, the hidden station sets up an NAV (Network Allocation Vector) only for a transmission stop duration "Duration" of its own station equal to a duration in which data transmission based on the RTS/CTS procedure is expected to be performed, whereby collision maybe avoided. Upon reception of the CTS, the hidden terminal to the transmission station sets up the NAV for a transmission stop duration, so as to avoid collision with a data packet; upon reception of the RTS, the hidden terminal to the reception station stops a transmission duration, so as to avoid collision with an ACK.

The transmission stop duration depends on a value of a transmission data length divided by a transmission rate. Usually, a communication station transmitting a packet is prompted to describe Duration value for which NAV shall be set up in the MAC header. Peripheral stations that are not another party of communication analyze the MAC header of a transmission frame, and sets up the NAV for a duration corresponding to the Duration value, so as to evade a transmission operation.

Here, in the case where a packet is transmitted at a transmission rate that is not supported by the peripheral stations, it is difficult for the peripheral stations to set up the NAV for a proper transmission stop duration, which causes a problem that collision can no longer be avoided. As this solution, it is conceivable to adopt a method in which a communication station in conformity to IEEE802.11n supporting high-speed transmission rate spoofs a Phy header so that a communication station in conformity to IEEE802.11a may set up a transmission stop duration properly. For example, a description of JP-A2004-366912 that has already been transferred to the present applicant discloses a method of allowing the peripheral stations to acquire a correct transmission stop duration by spoofing the transmission data length and the transmission rate in the Phy header of a packet.

When a plurality of transmission rates coexist in a single system, a handshake procedure to check a transmission rate used in communication between communication stations that perform transmission and reception of packets becomes necessary. Since the transmission rate as referred to herein is expressed by a combination of a communication band and a modulation scheme, it is also called MCS (transmission rate)

(Modulation Coding Scheme). That the transmitting side requests the receiving side for a transmission rate is called MRQ (MCS (transmission rate) request); that the receiving side feeds back a transmission rate to the transmitting side is called an MFB (MCS (transmission rate) feedback).

It is possible for the transmitting side to determine a transmission rate based on significance of transmit data. For example, in the case of more significant data, a lower transmission rate will be applied, so that a receiving error in the receiving side is avoided. On the other hand, since the receiving side can acquire channel information using a preamble part of a packet, high (i.e., optimum) transmission rate that is allowed depending on ever changing channel situation can be known.

Duration is calculable using a transmission rate that was fixed between the transmitting and the receiving sides. However, if the determination right of a transmission rate was given to either of the transmitting or the receiving communication station, since the Duration value has already been set up using a specified transmission rate, it is difficult for a communication station without the determination right of a transmission rate to revise the transmission rate. Since a peripheral station sets up the NAV with the already received Duration value, if the transmission rate is changed freely, it may change a transmitting duration of a transmission frame and may invite a collision.

In the present IEEE802.11n, because MCS feedback and setting of Duration are closely linked, a transmission station is given a determination right of MCS (transmission rate) and does not prioritize an MCS specified by the receiving side (see Non-patent Document 1). Moreover, because the Duration value will be set up based on a transmission rate specified by the transmitting side, it is difficult for the receiving side to revise this.

The receiving side is allowed to know a transmission rate that meets a channel situation. However, as specified by IEEE802.11TGn, in the case where the transmitting side is intended to have the determination right of a transmission rate, the transmitting side has no choice but to indiscriminately determine a transmission rate because the transmission side is unable to receive a feedback of a reception rate that the receiving side recommends.

[Non-patent Document 1]
  http://www.802wirelessworld.com/index.jsp

SUMMARY OF THE INVENTION

It is desirable, according to this invention, to provide an excellent wireless communication system whose communication station can ideally perform random access under a wireless communication environment in which a plurality of transmission rates are available, a wireless communication method, and a computer program therefor.

It is further desirable, according to this invention, to provide an excellent wireless communication system in which communication stations making random access can perform information transmission using a proper transmission rate between the communication stations, a wireless communication apparatus, a wireless communication method, and a computer program therefor.

It is further desirable, according to this invention, to provide an excellent wireless communication system in which, while a communication station of the transmitting side has the determination right of a transmission rate, it is possible for the transmitting side to receive a feedback of a transmission rate that the communication station of the receiving side recommends, choose a proper transmission rate, and transmit information; a wireless communication apparatus; a wireless communication method; and a computer program therefor.

This invention was made in view of the above-mentioned problem, and its first embodiment is directed to a wireless communication system that transmits information using a proper transmission rate between communication stations under a communication environment in which a plurality of transmission rates coexist, having a first mode in which a transmission station for transmitting a packet determines a transmission rate fed back from the reception station as its transmission rate, a second mode in which the transmission station determines a transmission rate independently regardless of a feedback of a transmission rate from the reception station, and a third mode in which the transmission station determines a transmission rate while considering a transmission rate fed back from the reception station, when the transmission station determines a transmission rate used to transmit the next packet (and subsequent packets)

In the first mode, the reception station feeds back a transmission rate that should be used in the transmission of the next packet to the transmission station, and sets up a transmission stop duration of peripheral stations based on the transmission rate that is fed back. In the second mode, the reception station sets up a transmission stop duration of the peripheral stations based on the transmission rate specified by the transmission station. In the third mode, the reception station feeds back a transmission rate that should be used by the transmission station in the transmission of the next packet (and subsequent packets) to the transmission station, and sets up a transmission stop duration of the peripheral stations based on the default transmission rate specified by the transmission station.

Note that the "system" as referred to herein and hereafter indicates a logical set of a plurality of devices (or functional modules each realizing a specific function), regardless as to whether each device and each functional module exists in a single housing or not.

Generally, in any wireless communication system, a plurality of transmission rates coexist (are available), and thereby needs a handshake procedure to check a transmission rate that is used in communication between communication stations performing transmission/reception of a packet, namely MCS (transmission rate).

The transmitting side can determine a transmission rate on the basis of the significance of transmission data. On the other hand, the receiving side can recommend a suitable transmission rate based on a channel situation.

Here, if the determination right of a transmission rate is given to either the transmitting or the receiving communication station, since the Duration value has already been set using a specified a transmission rate, there is a problem that a communication station without the determination right of a transmission rate is unavailable for revising the transmission rate.

In systems where MCS (transmission rate) feedback and setting of Duration are closely linked with each other, the transmission station is given an MCS (transmission rate) and the receiving side does not prioritize an MCS (transmission rate) specified by the receiving side. Moreover, since the transmitting side sets up Duration value based on the transmission rate specified by the transmitting side, the receiving side is unavailable for revising this. In such a case, it is difficult for the transmitting side to receive a feedback of a transmission rate recommended by the receiving side and has no choice but to determine a transmission rate indiscriminately.

On the other hand, the wireless communication system according to an embodiment of this invention has, when the transmission station determines a transmission rate,: a first mode in which the transmission station determines a transmission rate fed back from the reception station as its transmission rate, a second mode in which the transmission station determines a transmission rate independently regardless of a feedback of a transmission rate from the reception station, and additionally a third mode in which the transmission station finalizes a transmission rate while obtaining a transmission rate fed back from the reception station.

In this third mode, it is possible for the transmission station to finalize a transmission rate considering the significance of transmission data while referring to information of a transmission rate recommended by the reception station. For example, the transmission station finalizes a transmission rate used to transmit a data packet considering the significance of transmission data requested from the upper layer of the communication protocol etc. power consumption necessary at the time of data transmission (for example, a communication apparatus is driven by a battery), etc. as well as a recommended transmission rate fed back from the reception station.

These first to third modes correspond to a policy that which communication station is given a final determination right of a transmission rate, and the transmission station determines any one of the modes as its mode prior to transmission of a data packet.

The transmission station is configured to describe the default transmission rate used to transmit its next packet and its current mode in the transmitting packet. Based on these pieces of information of a receiving packet, the reception station is enabled to acquire the default transmission rate instructed by the transmission station and whether it is possible for the reception station to feed back a transmission rate (namely, recommend it).

Since in the first mode, the determination right of a transmission rate is given to the reception station, the reception station feeds back a transmission rate that should be used to transmit the next packet (packet right after the current packet) to the transmission station. Moreover, since it is fixed that the transmission station transmits the next packet at this recommended transmission rate, the reception station should just set up a transmission stop duration of the peripheral stations based on the recommended transmission rate. The transmitting side transmits the next packet at the recommended transmission rate fed back from the reception station.

In the second mode, since the reception station is not allowed to feed back a transmission rate (that is, the determination right of a transmission rate is not given to the reception station), the reception station should just set up a transmission stop duration of the peripheral stations based on the transmission rate specified by the transmission station. The transmitting side transmits the next packet at the default transmission rate regardless of the presence of a feedback of a transmission rate from the reception station.

In the third mode, the reception station is allowed to feed back a transmission rate, but the final determination right is given to the transmission station. In this case, the reception station feeds back a transmission rate that should be used to transmit the next next packet to the transmission station. Since the default transmission rate is used for transmission of a packet right after the packet, the reception station sets up a transmission stop duration of the peripheral stations based on the default transmission rate specified by the transmission station. On the other hand, a transmission station finalizes a transmission rate of the next next packet considering the significance of transmission data demanded from the upper layer of the communication protocol etc., information about power consumption, and the like as well as a recommended transmission rate obtained from the reception station (namely, information about propagation path environment). Then, for example, the transmission station sets up either the first or the second mode, and instructs a transmission rate of the next packet using a packet right after receiving a feedback from the reception station. Although the transmission station transmits the next packet at the default transmission rate, it is also possible to transmit the next next packet at the recommended transmission rate.

Thus, according to the wireless communication system of the first embodiment of this invention, when the transmission station determines a transmission rate that should be used to transmit the next packet, a third mode is prepared in addition to the first and the second modes, whereby it is possible for the transmission station to retain the right to finalize a transmission rate while having a mechanism that allows the reception station to recommend a transmission rate. By allowing this operation, it becomes possible for the transmission station to receive a feedback that considers a propagation path environment from the reception station and choose a transmission rate on the basis of the significance of a packet. For example, an important packet, such as an ACK, is transmitted at a low transmission rate, which is more robust to errors, than a recommended rate by the reception station, and thereby enabling the transmission station to respond flexibly to a feedback from the reception station.

Although the transmission station describes the default transmission rate to be used to transmit the next packet and a current mode on a transmitting packet, it may describe either of the first or the third mode instead. In this case, if the second mode is specified, the reception station is not allowed to feed back a transmission rate.

Alternatively, the transmission station may describe either the first or the second mode as the current mode. In this case, even if the second mode is specified, the reception station is allowed to feedback a transmission rate. Then, when the transmission station specified the second mode and received a feedback of a transmission rate, the transmission station may finalize a transmission rate of the next next packet while considering the transmission rate fed back from the reception station.

In wireless communication systems, in order to circumvent a hidden terminal problem, prior to data transmission, a transmission request and acknowledgment notification procedure is performed. Along with this procedure, handshake to determine a transmission rate can be made.

For example, the transmission station sets up a default transmission rate at which a data packet is transmitted and its mode, and transmits a transmission request packet that carries a size of a data packet, the default transmission rate, and the mode to the reception station. In response to this, the reception station determines whether there is a feedback of a transmission rate based on a mode described in the transmission request packet, sets up a transmission stop duration of the peripheral stations based on a transmission rate of a data packet being subsequently transmitted (right after it) to the transmission request packet, and transmits an acknowledgment notification packet to the transmission station.

Where the first mode is specified by the transmission request packet, the reception station feeds back a recommended transmission rate that is recommended to be used at the time of data packet reception by the acknowledgment notification packet, and sets up a transmission stop duration of the peripheral stations based on the recommended transmission rate. The transmission station transmits a data packet at the transmission rate fed back from the reception station.

When the second mode is specified by the transmission request packet, the reception station sets up the transmission stop duration of the peripheral stations based on the default transmission rate specified by the transmission request packet. Then the transmission station transmits a data packet at the default transmission rate.

On the other hand, when the third mode is specified by the transmission request packet, the reception station feeds back the recommended transmission rate that is recommended to be used at the time of data packet reception by the acknowledgment notification packet, and sets up a transmission stop duration of the peripheral stations based on the default transmission rate specified by the transmission request packet. In addition, the transmission station transmits a data packet at the default transmission rate, and determines a default transmission rate to be used at the time of transmission of the next next data packet, referring to a recommended transmission rate fed back from the reception station.

Alternatively, even when the second mode is specified by the transmission request packet, the reception station may feed back a recommended transmission rate, if necessary, by the acknowledgment notification packet. In this case, the reception station is configured to set up a transmission stop duration of the peripheral stations based on the default transmission rate specified by the transmission request packet. Moreover, the transmission station transmits a data packet at the default transmission rate, and determines a default transmission rate used when transmitting the next next data packet, referring to a recommended transmission rate fed back from the reception station.

A second embodiment of this invention is directed to a computer program described in a computer readable form for executing, on a computer system, processing to make information transmission by setting up a transmission rate under a communication environment where a plurality of transmission rates coexist, the program, when in data transmission, causes the computer system to execute the procedures of:

setting up any one mode selected from among a first mode of determining a transmission rate fed back from the reception station as its transmission rate, a second station of determining a transmission rate independently regardless of a feedback of a transmission rate from the reception station, and a third mode of determining its transmission rate to be used to transmit the next next packet considering a transmission rate fed back from the reception station and transmitting a data packet right after the reception of a feedback at the default transmission rate; and transmitting data at a transmission rate determined based on both the setup mode and the transmission rate fed back from the reception station.

A third embodiment of this invention is directed to a computer program described in a computer readable form for executing, on a computer system, processing to make information transmission by setting up a transmission rate under a communication environment where a plurality of transmission rates coexist, the program, when in data reception, causes the computer system to execute the procedures of:

checking which one mode is selected from among a first mode where the transmission station transmits data at a transmission rate fed back from the local station to the computer system, a second mode where the transmission station determines a transmission rate independently regardless of a feedback of a transmission rate from the local station, and a third mode where the transmission station determines a transmission rate to be used to transmit the next next packet considering the transmission rate fed back from the local station and transmits a data packet right after the reception of a feedback at the default transmission rate;

feeding back a transmission rate that should be used in the transmission of the next packet to the transmission station in the first mode and setting a transmission stop duration of peripheral stations based on a transmission rate that is fed back;

setting up a transmission stop duration of the peripheral stations based on a transmission rate specified by the transmission station in the second mode; and feeding back a transmission rate that should be used to transmit the next next packet to the transmission station in the third mode, and setting a transmission stop duration of the peripheral stations based on the default transmission rate specified by the transmission station.

A computer program according to each of the second and third embodiments of this invention defines a computer program written in a computer-readable format so as to realize a predetermined processing on the computer system. In other words, by installing a computer program according to each of the second and third embodiments of this invention, a computer system will work a cooperative effect, and these computers will operate the transmission station and the reception station, respectively. A plurality of such a wireless communication apparatus are activated to constitute a wireless network, whereby the same action effect as that of the wireless communication system according to the first embodiment of this invention can be obtained.

According to the embodiments of this invention, there is provided an excellent wireless communication system in which it is possible for a communication station to make random access properly under s communication environment that allows a plurality of transmission rate to be used; a wireless communication apparatus; a wireless communication method; and a computer program therefor.

According to the embodiments of this invention, there is provided an excellent wireless communication system in which it is possible for a communication station making random access to transmit information using a proper transmission rate between them; a wireless communication apparatus; a wireless communication method; and a computer program therefor.

According to the embodiments of this invention there is provided an excellent wireless communication system in which while a communication station of a transmitting side retains the determination right of a transmission rate, it is possible for the transmission station to choose a proper transmission rate and transmit information, receiving a feedback of a transmission rate that is recommended by a communication station of the receiving side; a wireless communication apparatus; a wireless communication method; and a computer program therefor.

According to a wireless communication system concerning the embodiments of this invention, the wireless communication system is provided with a third mode in which the transmission station determines a transmission rate of the next next packet while obtaining a transmission rate fed back from the reception station, in addition to a first mode in which a transmission rate fed back from the reception station is determined as its transmission rate and a second mode in which the transmission station determines a transmission rate independently regardless of a feedback of a transmission rate from the reception station, whereby it is possible for the transmission station to retain the right to finalize a transmission rate, while having a mechanism that allows the reception station to recommend a transmission rate.

Another objects, features, and advantages of this invention will be clarified by more detailed explanation based on embodiments of this invention and attached drawing that will be later described.

BRIEF DESCRIPTION OF THE DRAWINGS

Embodiments of the present invention will be described in detail based on the following figures, wherein.

PREFERRED EMBODIMENTS OF THE INVENTION

Embodiments of this invention will be described in detail, with reference to drawings.

A propagation path of communication supposed in this invention is radio, whereby a network is constructed among a plurality of communication stations. Communications supposed in this invention is traffic of a storage exchange type, where information is transferred per packet.

In a wireless network according to an embodiment of this invention, communication stations transmit information directly (indiscriminately) according to an access procedure based on the CSMA (Carrier Sense Multiple Access) and are capable of constituting an autonomous distributed wireless network.

A wireless network according to an embodiment of this invention supposes, for example, IEEE802.11n, and a plurality of transmission rates coexist. The transmission rate described in this description is also called the MCS (Modulation Coding Scheme), because the transmission rate is expressed by a combination of a communication band and a modulation scheme. Although the determination right of a transmission rate is fundamentally given to a communication station of a packet transmitting side, the transmission rate of a packet to be subsequently transmitted is finalized through an MRQ/MFB handshake procedure between the transmitting and the receiving sides: the transmission station transmits an MRQ (MCS (transmission rate) request for a transmission rate MCS (transmission rate)), and the reception station sends back an MFB (MCS (transmission rate) feedback) to feed back a desired transmission rate). Details of the MRQ/MFB handshake will be explained in a later paragraph.

Figure 1:
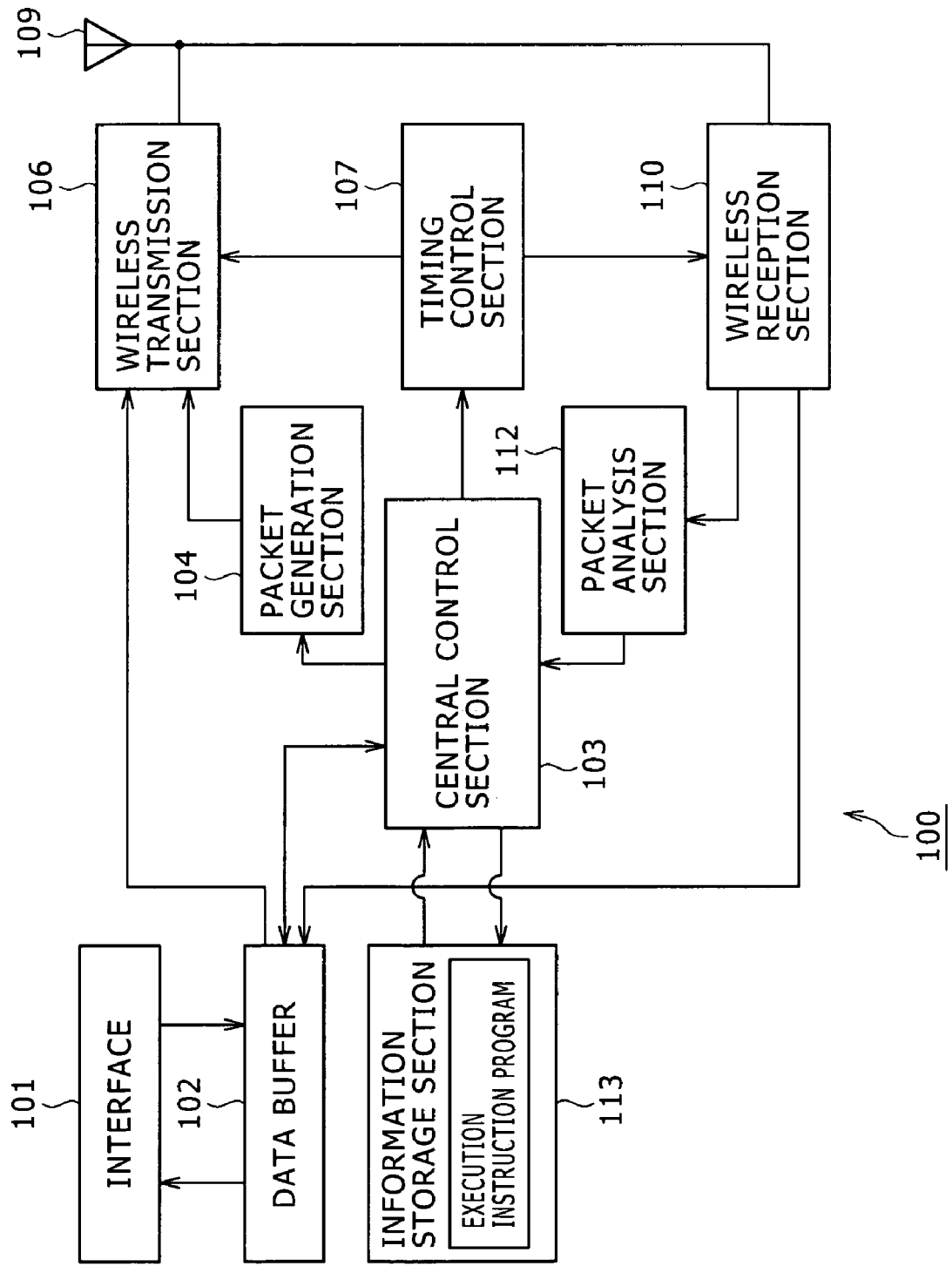
FIG. 1 is a diagram schematically showing a functional configuration of a wireless communication apparatus operating as a communication station in a wireless network according to one embodiment of this invention.

FIG. 1 schematically shows a functional configuration of a wireless communication apparatus that operates as a communication station in a wireless network according to one embodiment of this invention. It is possible for the illustrated wireless communication apparatus 100 to form a network while evading collisions by effectively performing channel access within the same wireless system.

As shown in the figure, the wireless communication apparatus 100 is constructed with an interface 101, a data buffer 102, a central control section 103, a packet generation section 104, a wireless transmitting section 106, a timing control section 107, an antenna 109, a wireless receiving section 110, a packet analysis section 112, and an information storage section 113.

The interface 101 exchanges various pieces of information with an external apparatus (for example, a personal computer (not shown) etc.) connected with this wireless communication apparatus 100.

The data buffer 102 is used to temporarily store data sent from a device connected via the interface 101 and data received via the wireless transmission path until transmitting out the data via the interface 101.

The central control section 103 performs management of a series of information transmitting and receiving processing in the wireless communication apparatus 100, and access control of the transmission path collectively. Basically, the central control section 103 performs media access control in which it operates a timer of backoff for a random time while monitoring a mode of the transmission path based on the CSMA, and if there is no transmitting signal during this time, it acquires a transmission right.

Although in this embodiment the determination right of a transmission rate is fundamentally given to a communication station of a packet transmitting side, three kinds of MRQ modes for feeding back a transmission rate recommended by the reception station are defined. When the wireless communication apparatus 100 operates as a transmission station or reception station, the central control section 103 performs the MRQ/MFB handshake procedure according to the MRQ mode. This will be explained in detail later.

The packet generation section 104 generates a packet signal to be transmitted to peripheral stations from the local station. Packets as referred to herein may include a transmission request packet of a communication station of the receiving side, an acknowledgment notification packet answering this, i.e., an ACK packet, as well as a data packet. For example, a data packet is generated cutting out transmission data stored in the data buffer 102 by a predetermined length, which will be assigned as a payload to constitute a packet. A MAC layer of a communication protocol adds a MAC header to the payload to compose a MAC frame, and further Phy layer adds a Phy header thereto to make up a final transmitting packet composition. A packet composition is such that a Duration value that should set up the NAV is described in the MAC header. The Duration value can be found by dividing the data length of a packet by a transmission rate fixed between the transmitting and the receiving sides. The packet analysis section 112 analyzes a packet signal that was successfully received from the another station.

The wireless transmitting section 106 and the wireless receiving section 110 correspond to the RF layer and the Phy layer in the communications protocol.

The wireless transmitting section 106 performs wireless transmission processing of a packet signal by a predetermined modulation system and at a predetermined transmission rate. Specifically, the wireless transmitting section 106 includes a modulator for modulating a transmitting signal by a predetermined modulation system, a D/A converter for converting a digital transmitting signal into an analog signal, an upconverter for up-converting the analog transmitting signal by converting its frequency, a power amplifier (PA) for amplifying an electric power of the up-converted transmitting signal (none of them shown in the figure), and performs wireless transmission processing at a predetermined transmission rate.

The wireless receiving section 110 performs wireless receiving processing of a packet signal from another station. Specifically, the wireless receiving section 110 consists of a low-noise amplifier (LNA) for amplifying a voltage of a wireless signal received from another station via the antenna 109, a down converter for down-converting the receiving signal whose voltage was amplified by frequency conversion, an automatic gain controller (AGC), an A/D converter for converting an analog receiving signal into a digital signal, a decoder for performing decoding processing by a decoding method of a synchronization process for synchronization, channel estimation, OFDM, etc., and the like (none of them shown in the figure).

In this embodiment; the determination right of a transmission rate is given to either the transmitting side of a packet or the receiving side, and a transmission rate of a packet to be subsequently transmitted is finalized through a handshake procedure between the transmitting and the receiving sides (to be described later). The wireless transmitting section 106 and the wireless receiving section 110 perform transmission and reception operations of a signal according to a band and a modulation scheme that make up the fixed transmission rate, respectively.

The antenna 109 send a signal by radio on a predetermined frequency channel to the other wireless communication apparatus and collects signals transmitted from the other wireless communication apparatus. With this embodiment, the apparatus has a single antenna, and it is assumed that the apparatus is incapable of performing transmission and reception in parallel.

The timing control section 107 controls timing for transmitting and receiving a radio signal. For example, it performs timing control such as setting of a packet transmission timing of the local station (setting of an inter frame space IFS and the backoff) and setting of an NAV at the time of reception of a packet destined to another station.

The information storage section 113 stores instructions of execution procedures, such as a series of access control operations performed in the central control section 103, information obtained from analysis results of a receiving packet, etc.

The wireless network according to an embodiment of this invention assumes IEEE802.11n, for example, and a plurality of transmission rate MCS (transmission rates) coexist. The transmission rate of a packet to be subsequently transmitted is finalized through the MRQ/MFB handshake procedure between the transmitting and the receiving sides: the transmission station transmits an MRQ (MCS (transmission rate) request for a transmission rate MCS (transmission rate)), and the reception station sends back the MFB for feeding back a desired transmission rate MCS (transmission rate). The transmitting side is allowed to determine a transmission rate on the basis of the significance of transmission data. In contrast to this, it is possible for the receiving side to determine a proper transmission rate based on a channel situation.

Although the determination right of a transmission rate is fundamentally given to the communication station of a packet transmitting side in the MRQ/MFB handshake procedure proposed by IEEE802.11n when this application was filed, there are defined two kinds of modes: a first MRQ mode of determining the transmission rate fed back from the reception station as its transmission rate; and a second MRQ mode of determining a transmission rate independently regardless of a feedback of a transmission rate from the reception station.

Since in the first MRQ mode, the determination right of a transmission rate is given to the reception station, the reception station feeds back a transmission rate recommended for transmission of the next packet to the transmission station. Moreover, since it is fixed that the transmission station transmits the next packet at this transmission rate, the reception station sets up a transmission stop duration "Duration" of the peripheral stations based on a transmission rate recommended to the transmission station. The transmitting side transmits the next packet at the recommended transmission rate fed back from the reception station.

Since in the second MRQ mode, the reception station is not allowed to feed back a transmission rate, the reception station prioritizes the default transmission rate specified by the transmission station, and sets up the transmission stop duration of the peripheral stations based on this transmission rate. The transmitting side transmits the next packet at the default transmission rate regardless of the presence of a feedback of a transmission rate from the reception station.

Where the MRQ/MFB handshake procedure is performed while the first and the second MRQ mode are used properly, because the MCS (transmission rate) feedback and the setting of Duration are closely linked, the transmission station is given the determination right of MCS (transmission rate) and does not prioritize MCS (transmission rate) specified by the receiving side. In this case, since Duration value is set up based on the transmission rate specified by the transmitting side, it is difficult for the receiving side to revise this. That is, even when the receiving side wishes to recommend a transmission rate that meets a channel situation, the transmitting side is unavailable for receiving a feedback and the transmitting side does not have a choice but to determine a transmitting rate indiscriminately.

In view of this, in this embodiment, a third MRQ mode in which the transmission station finalizes a transmission mode while obtaining a transmission rate fed back from the reception station is defined additionally. Although in this third MRQ mode, the reception station is allowed to feedback a transmission rate, the transmission station is given the final determination right. In this case, the reception station feeds back a transmission rate that should be used to transmit the next packet to the transmission station. However, since the transmission station transmits the next (right after the reception of the feedback) packet at the default transmission rate, the transmission stop duration of the peripheral stations is set up based on the default transmission rate specified by the transmission station. The transmission station that was given the recommended transmission rate sets up the mode to one of the first to the third modes after finalizing a transmission rate of the next next packet, and instructs a transmission rate of the next next packet in the next packet.

It is possible for the MRQ/MFB handshake procedure to be performed together with a procedure whereby the transmitting side transmits the transmission request packet and the receiving side sends back an acknowledge notification packet.

In the wireless-communications field, the RTS/CTS method is widely known as a method of exchanging a transmission request and acknowledgment notification between the transmitting and the receiving sides. In this method, when a hidden terminal receives at least either of an RTS or CTS, the hidden terminal sets up an NAV only for a transmission stop duration during which data transmission based on the RTS/CTS procedure is expected to be performed, whereby collision is avoided. Any hidden terminal for the transmission station receives the CTS and sets up a transmission stop duration, so that collision with a data packet is avoided; any hidden terminal for the reception station receives an RTS and sets up a transmission duration, so that collision with the ACK is avoided.

In IEEE802.11TGn, the transmission station transmits an IAC (Initiator Aggregated Control) packet that serves a function equivalent to that of the RTS and the reception station sends back an RAC (Responder Aggregated Control) packet that has a function equivalent to that of the CTS, whereby the reception station performs a transmission request corresponding to the RTS/CTS and acknowledgment notification. An MRQ/MFB handshake operation using an IAC/RAC procedure will be explained below.

Figure 2:
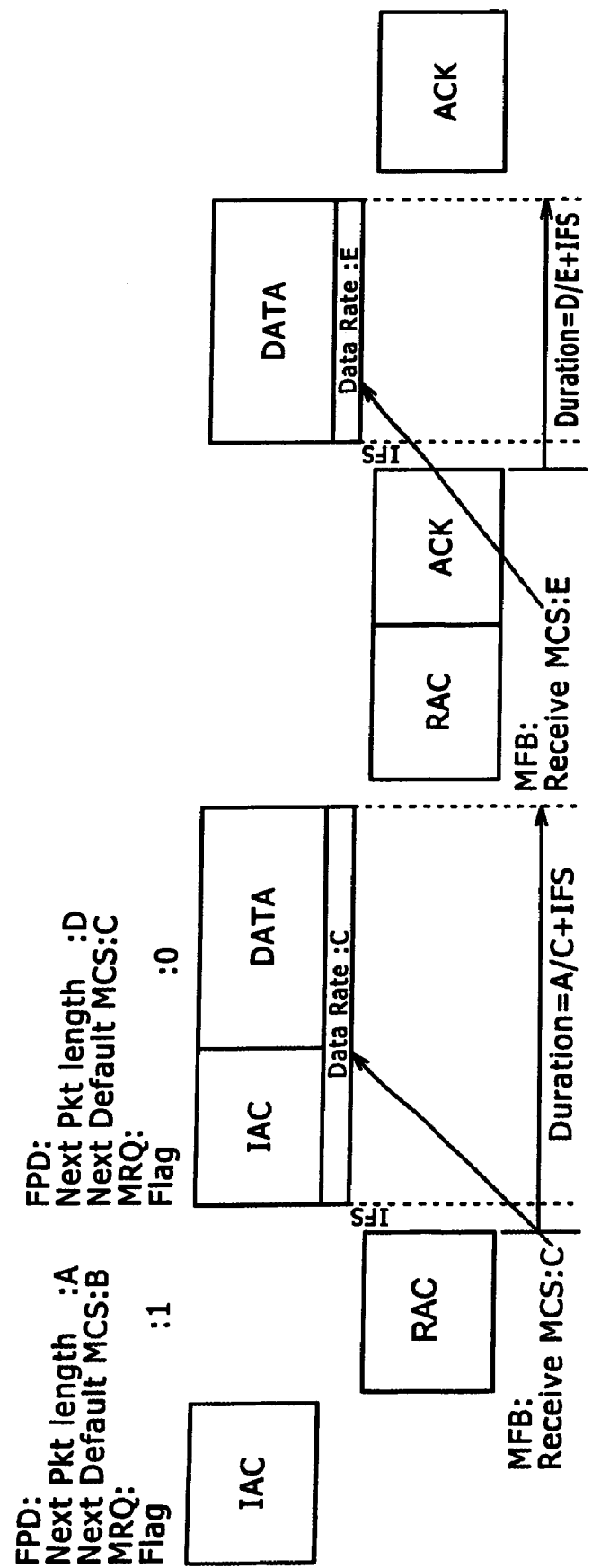
FIG. 2 is a diagram showing an MRQ/MFB handshake operation sequence in a first MRQ mode.

FIG. 2 shows the MRQ/MFB handshake operation sequence in a first MRQ mode. In this case, the transmission station having a determination right of a transmission rate describes MRQ=1 indicating that the station is in the first mode in the IAC corresponding to the RTS.

This IAC packet holds a value called FPD (Following Packet Descriptor) for describing information about a packet that the packet transmission station will subsequently transmit. In the FPD, the size of a data packet to be subsequently transmitted (Next Packet Length) and a transmission rate at which the data packet is to be transmitted (Next Default MCS (transmission rate)) are described. The predetermined transmission rate is a default value to which the transmission rate is set as it is, if there is no transmission rate recommended from the reception station. The IAC shown in FIG. 2 carries Next Packet Length=A and Next Default MCS (transmission rate)=B on it.

Receiving a description of MRQ=1 in the IAC, the reception station that transmits the RAC corresponding to the CTS is led to recognize that it is in the first MRQ mode, that is, the final determination right of a transmission rate is given to the reception station, and the next data packet will be transmitted at the MCS (transmission rate) recommended by the local station. Then, if the local station is in a mode capable of calculating an optimum MCS (transmission rate) at which the local station performs reception, the local station calculates the MCS (transmission rate) at which a data packet being subsequently transmitted is received and specifies this by the MFB when sending back the RAC. In FIG. 2, an optimum value of Receive MCS (transmission rate)=C is set. Moreover, if the reception station is in a mode incapable of calculating an optimum MCS (transmission rate) at which the local station performs reception, the local station copies a Default MCS (transmission rate) specified in the IAC to the MFB and sends back the RAC.

When the optimum MCS (transmission rate) is fed back, the transmission station will send, the next data packet using the optimum MCS (transmission rate) instead of Default MCS (transmission rate), and consequently the reception station can fix Duration at the time when the reception station feeds back the transmission rate. Then, the reception station calculates a time necessary to receive the data packet being subsequently transmitted based on Next Packet Length and Receive MCS (transmission rate) and describes its value in the header of the RAC packet as Duration. In the illustrated example, a value of the data length A divided by the recommended transmission rate C added with an inter frame space IFS, (A/C+IFS), is designated as Duration. By setting up this Duration value, it is made possible to configure a hidden terminal incapable of hearing a data packet not to hinder reception of data packets.

Then, when the transmission station received the RAC packet, it transmits a data packet at Receive MCS (transmission rate) specified by the reception station.

Figure 3:
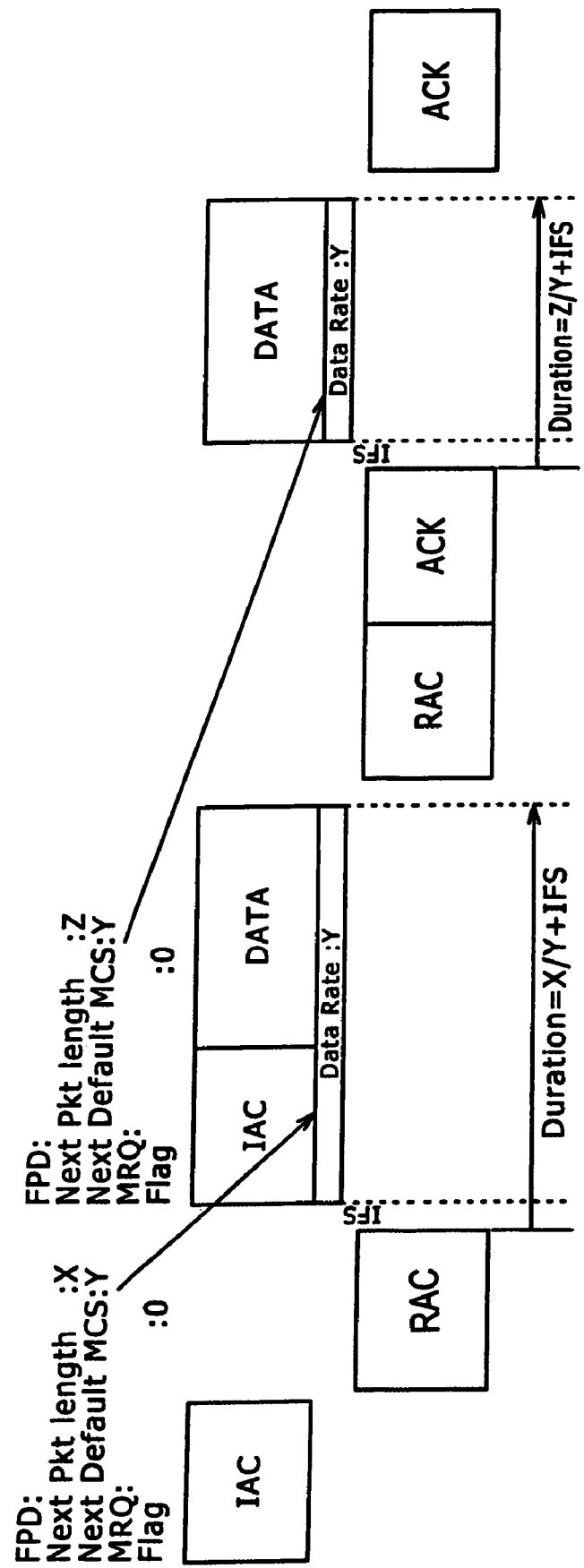
FIG. 3 is a diagram showing the MRQ/MFB handshake operation sequence in a second MRQ mode.

FIG. 3 shows the MRQ/MFB handshake operation sequence in the second MRQ mode. In this case, the transmission station with the determination right of a transmission rate describes MRQ=0, which indicates that the transmission station is in the second MRQ station, in the IAC corresponding to the RTS.

This IAC packet holds an FPD value that describes information about a packet that the packet transmission station will subsequently transmit. The IAC shown in FIG. 3 carries Next Packet Length=X and Next Default MCS=Y on it.

Receiving a description of MRQ=0 in the IAC, the reception station that transmits the RAC corresponding to the CTS is led to recognize that the reception station is in the second MRQ mode, that is, being not allowed to recommend an MCS (transmission rate). Then, the reception station calculates a time necessary to receive a data packet being subsequently transmitted, based on Next Packet Length and Default MCS (transmission rate), designates the value as Duration, and describes it in the MAC header of the RAC packet. In the illustrated example, a value of the data length X divided by the default transmission rate Y added with an inter frame space IFS, (X/Y+IFS), is designated as Duration. By setting up this Duration value, it is made possible to configure a hidden terminal incapable of hearing a data packet not to hinder reception of data packets.

Then, when the transmission station received the RAC packet, the transmission station transmits a data packet at Default MCS (transmission rate) that was set up by itself.

In the second MRQ mode described above, the transmission station is given the determination right of MCS (transmission rate) and does not prioritize the MCS (transmission rate) specified by the receiving side. In this case, since the Duration value is set up based on the transmission rate specified by the transmitting side, even when the reception station wishes to recommend an optimum MCS (transmission rate), the reception station is unavailable for revising this. Contrary to this, in the third MRQ mode, although the transmission station is given the final determination right of MCS (transmission rate), the reception station is allowed to feed back an optimum MCS (transmission rate).

Figure 4:
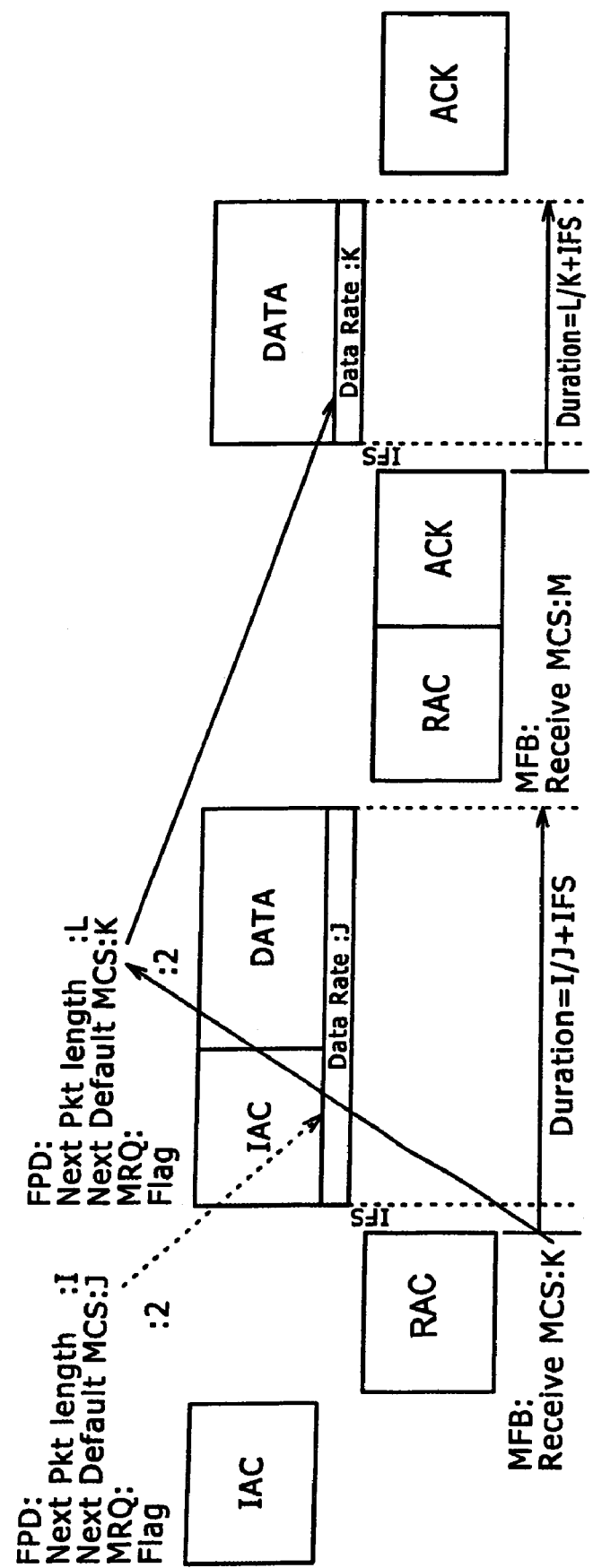
FIG. 4 is a diagram showing the MRQ/MFB handshake operation sequence in a third MRQ mode.

FIG. 4 shows the MRQ/MFB handshake operation sequence in the third MRQ mode. In this case, the transmission station with the determination right of a transmission rate describes MRQ=2 that indicates the reception station is in the third mode in the IAC corresponding to the RTS.

This IAC packet holds an FPD value that describes information about a packet that the packet transmission station will subsequently transmit. The IAC shown in FIG. 4 carries Next Packet Length=I and Next Default MCS=J on it.

Receiving a description of MRQ=2 in the IAC, the reception station that transmits the RAC corresponding to the CTS is set in the third MRQ, that is, the reception station is led to recognize that, although the transmission station retains the final determination right, the reception station is allowed to recommend an MCS (transmission rate). Then, if the local station is in a mode where it is possible for an optimum MCS (transmission rate) at which the local station performs reception to be calculated, the reception station calculates an MCS (transmission rate) to be used to receive the data packet being subsequently transmitted and specifies it in the MFB when the RAC is sent back. In FIG. 4, the optimum value Receive MCS is designated as K.

Since in the data packet being subsequently transmitted the transmission station uses Default MCS (transmission rate) declared in the IAC, the reception station calculates a time necessary to receive a data packet being subsequently transmitted based on Next Packet Length and Default MCS (transmission rate), and describes it in the MAC header of the RAC packet. In the illustrated example, a value of the data length I divided by the default transmission rate J added with an inter frame space IFS, (I/J+IFS), is designated as Duration. By setting up this Duration value, it is made possible to configure a hidden terminal incapable of hearing a data packet not to hinder reception of data packets.

Moreover, when the transmission station accepts an optimum MCS (transmission rate) fed back from the reception station, the transmission station determines this rate as the Default MCS (transmission rate) to be used at the time of transmission of subsequent data packets. In the example shown in FIG. 4, the transmission station declares the transmission rate K that is an optimum MCS as Default MCS (transmission rate) in the IAC added on the top of the data packet being subsequently transmitted. Further, the next next data packet is transmitted by the optimum transmission rate K thus fed back.

Figure 5:
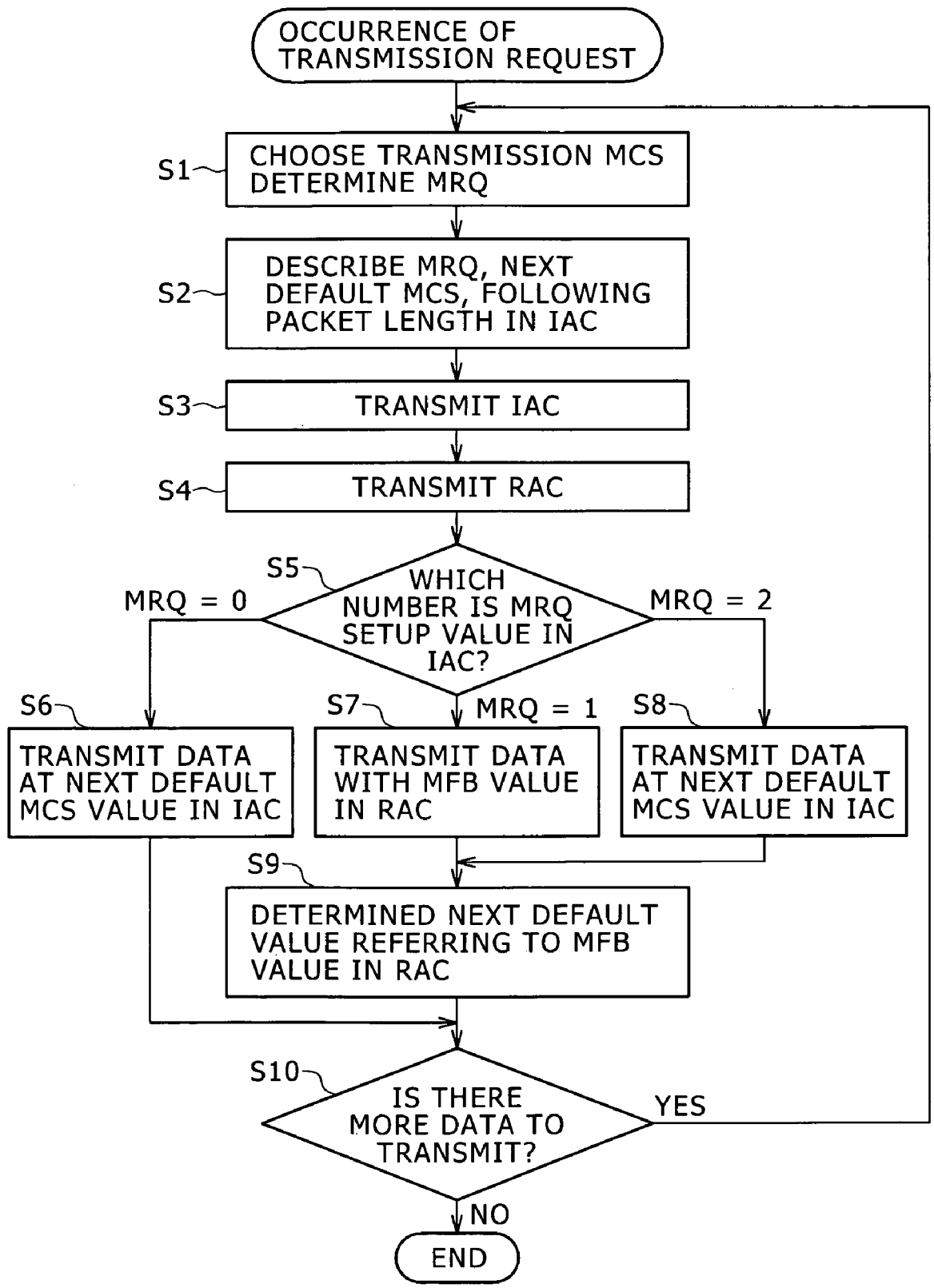
FIG. 5 is a flowchart showing processing operations of the transmission station for realizing the MRQ/MFB handshake operation using an IAC/RAC procedure shown in FIGS. 2 to 4.

FIG. 5 shows a processing operation of the transmission station for realizing the MRQ/MFB handshake operation using the IAC/RAC procedure shown in FIGS. 2 to 4 in the form of a flowchart. This processing operation is realized in the form such that the central control section 103 executes an execution instruction program read from the information storage section 113.

When a transmission request occurs from the upper layer of the communication protocol, the transmission station chooses a transmission rate MCS (transmission rate) used at the time of data packet transmission and determines a policy of the MRQ stare (that is, which one of transmitting and reception stations has the final determination right of a transmission rate) (Step S1).

The transmission station generates an IAC packet corresponding to the RTS in which the MRQ value determined in the FPD and Next Default MCS (transmission rate) and Following Packet Length (Step S2) are described, and transmits this to the reception station (Step S3).

Th reception station that received the IAC packet sends back the RAC packet corresponding to the CTS. When the transmission station received the RAC packet (Step S4), the transmission station performs transmission processing of the next data packet depending on an MRQ mode being set in the IAC (Step S5).

If MRQ=0 was set up, a data packet is transmitted at Default MCS (transmission rate) described in the FPD of the IAC packet (Step S6).

When MRQ=1 is set up, the transmission station transmits a data packet at the Receive MCS (transmission rate) (that is, a transmission rate recommended by the reception station) described as the MFB in the RAC packet (Step S7). Moreover, when MRQ=2 is set up, the transmission station transmits a data packet at Default MCS (transmission rate) described in the FPD of the IAC packet (Step S8).

With MRQ=1 and MRQ=2, since the MFB from the reception station is allowed, the transmission station determines Next Default MCS (transmission rate) about a data packet being transmitted subsequently after next referring to the MFB described in the RAC packet (Step S9).

After that, if there is more data to transmit, the flow returns to Step S1 and repeats the same processing operation as described above. (Step S10)

Figure 6:
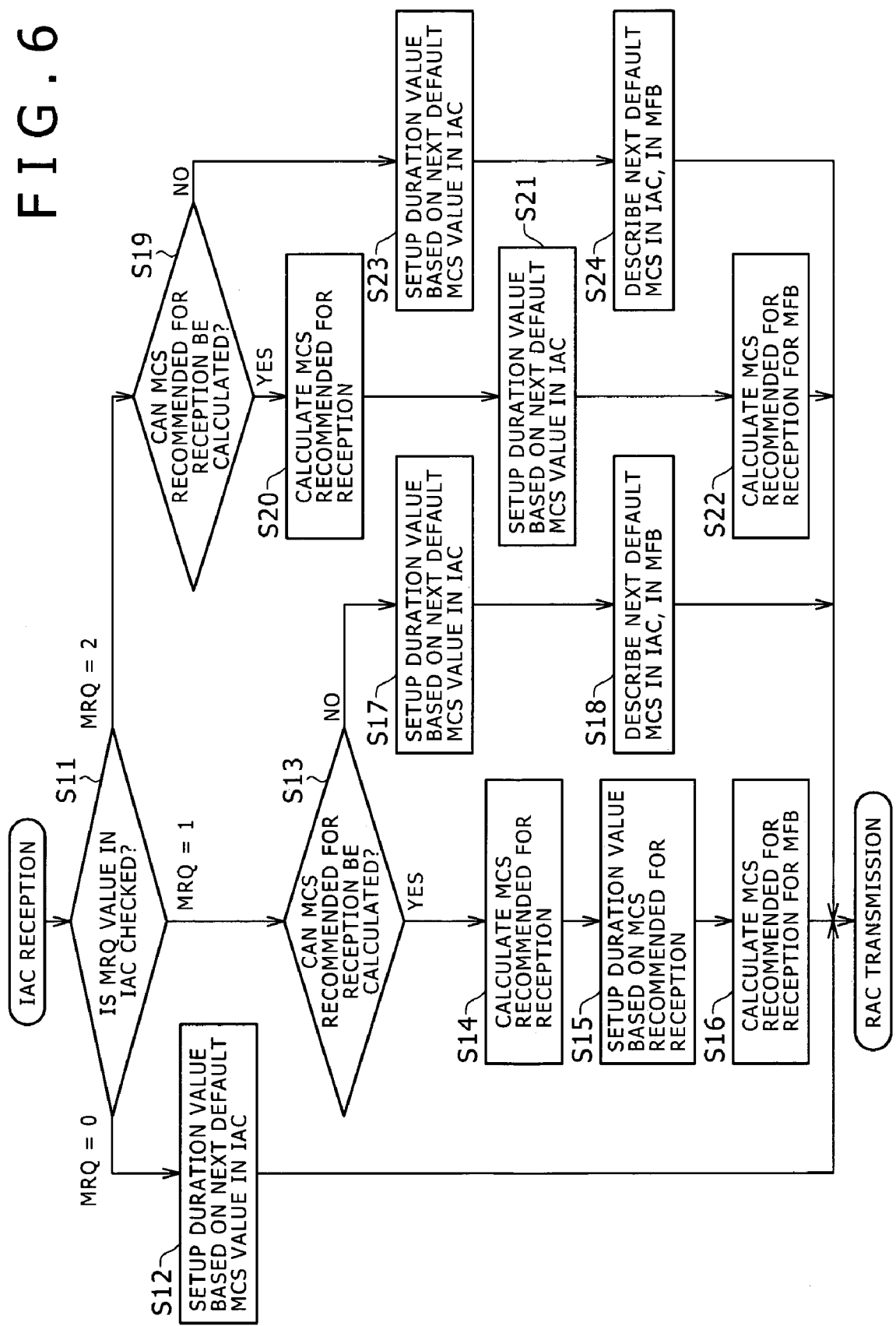
FIG. 6 is a flowchart showing processing operations by the reception station for realizing the MRQ/MFB handshake operation using the IAC/RAC procedure shown in FIGS. 2 to 4.

FIG. 6 shows a processing operation of the reception station to realize the MRQ/MFB handshake operation using the IAC/RAC procedure shown in FIGS. 2 to 4 in the form of a flowchart. This processing operation is realized in the form such that the central control section 103 executes an execution instruction program read from the information storage section 113.

When the reception station received the IAC packet destined to the local station, the reception station checks an MRQ value described in its FPD (Step S11).

Here, if MRQ=0 is described, the reception station is led to recognize that the reception station is not allowed to feed back a recommended MCS (transmission rate). In this case, based on Next Packet Length and Default MCS (transmission rate) described in the IAC packet, the reception station calculates a time necessary to receive a data packet being subsequently transmitted, and describes its value as Duration in the MAC header of the RAC packet (Step S12).

When MRQ=1 is described in the received IAC packet (Step S11), the reception station is led to recognize that the next data packet will be transmitted at the recommended MCS (transmission rate) fed back from the local station. Then, the local station checks whether it is possible for the local station to calculate an optimum MCS (transmission rate) at which the local station performs reception (Step S13).

If the reception station is in a mode capable of calculating an optimum MCS (transmission rate), the reception station calculates an MCS (transmission rate) that is recommended to be used at the time of data packet reception (Step S14). Moreover, since the transmission station will use the recommended MCS (transmission rate) instead of Default MCS (transmission rate) to send the next data packet, at this point of calculation the reception station can fix Duration. Then, based on Next Packet Length and the recommended MCS (transmission rate) thus calculated, the reception station calculates a time necessary to receive a data packet being subsequently transmitted, i.e., Duration value, and describes it in the MAC header of the RAC packet (Step S15). Then, the recommended MCS (transmission rate) is described in the MFB of the RAC packet (Step S16).

If although MRQ=1 is described in the IAC packet, the reception station is in a mode not capable of calculating an optimum MCS (transmission rate), the reception station calculates a time necessary to receive a data packet being subsequently transmitted, namely Duration value, based on Next Packet Length and MCS (transmission rate) described in the IAC packet, and describes it in the MAC header of the RAC packet (Step S17). Moreover, the reception station copies Default MCS (transmission rate) specified in the IAC to the MFB of the RAC packet (Step S18).

If the MRQ=2 is described in the received IAC packet (Step S12), the reception station is led to recognize that the reception station is allowed to recommend an MCS (transmission rate) although the transmission station retains the final determination right. Then, the flow checks whether it is possible for the local station to calculate an optimum MCS (transmission rate) (Step S19).

If the local station is in a mode of capable of calculating an optimum MCS (transmission rate), the reception station calculates the MCS (transmission rate) that is recommended to be used at the time of data packet reception (Step S20). Since the transmission station uses Default MCS (transmission rate) declared in the IAC for a data packet being subsequently transmitted, the reception station calculates a time necessary to receive a data packet being subsequently transmitted based on Next Packet Length and Default MCS (transmission rate), an describes the value in the MAC header of the RAC packet as Duration (Step S21). The, the recommended MCS (transmission rate) is described in the MFB of the RAC packet (Step S22).

Although "MRQ=2" is described in the IAC packet, if the reception station is in a mode not capable of calculating an optimum MCS (transmission rate), the reception station calculates a time necessary to receive a data packet being subsequently transmitted, namely Duration value, based on Next Packet Length and Next Default MCS (transmission rate) described in the IAC packet, and describes it in the MAC header of the RAC packet (Step S23). Moreover, the reception station copies Default MCS (transmission rate) specified in the IAC to the MFB in the RAC packet (Step S24).

Then, the reception station sends back the RAC packet generated by the above-mentioned processing to the transmission station, and stands by to receive a data packet being subsequently transmitted.

In the MRQ/MFB handshake operation shown in FIGS. 2 to 4, the MRQ mode of the transmission station is represented by using an MRQ value of 0-2, and 2 bits are used for the MRQ value. On the other hand, if the transmission station gives the determination right of a transmission rate to the reception station, MRQ=1 is described, and if the transmission station retains the final determination right, MRQ=0 is indicated (that is, both the second mode and the third mode are represented by MRQ=0), the MRQ value can be represented by only 1 bit.

The MRQ/MFB handshake operation in the case of giving the determination right of a transmission rate to the reception station, namely MRQ=1, is the same as that of FIG. 2. On the other hand, in the case of MRQ=0, that is, the transmission station retains the final determination right of a transmission rate, if the reception station does not perform the MFB, namely does not feed back an optimum transmission rate, the reception station becomes in the second MRQ mode where the reception station does not recommend a transmission rate. Moreover, in the case of MRQ=0 specified by the reception station, if the reception station performs the MFB, the transmission station operates as in the third MRQ mode, that makes finalizes a transmission rate while considering a feedback transmission rate.

Figure 7:
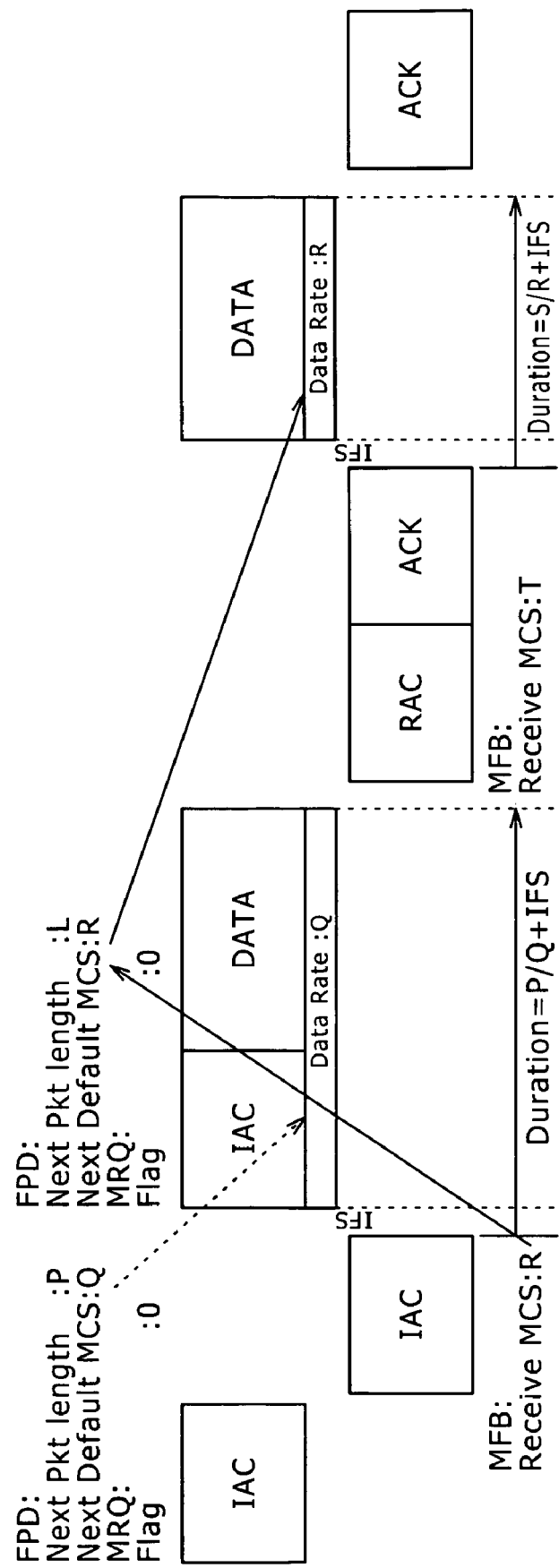
FIG. 7 is a diagram showing the MRQ/MFB handshake operation sequence in a third MRQ mode in the case where three kinds of MRQ modes are configured using MRQ values of 2 bits.

FIG. 7 shows the MRQ/MFB handshake operation in the third MRQ mode in the case of preparing three kinds of MRQ modes using an MRQ value of 2 bits in this way.

The transmission station describes MRQ=0 in the IAC corresponding to the RTS, indicating that it has the final determination right of a transmission rate. This IAC packet holds an FPD value that describes information about a packet that the packet transmission station will subsequently transmit. The IAC shown in FIG. 7 carries New Packet Length=P and Next Default MCS (transmission rate)=Q on it.

Receiving a description of MRQ=0 in the IAC, the reception station transmitting the RAC corresponding to the CTS is led to recognition that the transmission station retains the final determination right. Then, if the reception station is in a mode capable of calculating an optimum MCS (transmission rate) at which reception is performed, the reception station calculates an MCS (transmission rate) at which a data packet being subsequently transmitted is received and specifies it in the MFB when sending back the RAC, whereby the optimum MCS (transmission rate) is recommended. In FIG. 7, the optimum-value Receive MCS=R is specified.

Since the transmission station uses Default MCS (transmission rate) that was declared in the IAC for a data packet being subsequently transmitted, the reception station calculates a time necessary to receive a data packet being subsequently transmitted based on Next Packet Length and Default MCS (transmission rate), and describes the value as Duration in the MAC header of the RAC packet. In the illustrated example, a value of the data length P divided by the default transmission rate Q added with an inter frame space IFS, (I/J+IFS), is designated as Duration. By setting up this Duration value, it is made possible to configure a hidden terminal incapable of hearing a data packet not to hinder reception of data packets.

If the transmission station accepts the optimum MCS (transmission rate) fed back from the reception station, the transmission station determines this rate as Default MCS (transmission rate) to be used at the time of transmission of data packets that follow this packet. In the example shown in FIG. 7, the transmission station declares a transmission rate R that is an optimum MCS (transmission rate) as a Default MCS (transmission rate) by the IAC that is added on the top of a data packet to be subsequently transmitted. Then, for the next next data packet, the transmission station transmits data at the optimum transmission rate fed back from the reception station.

Figure 8:
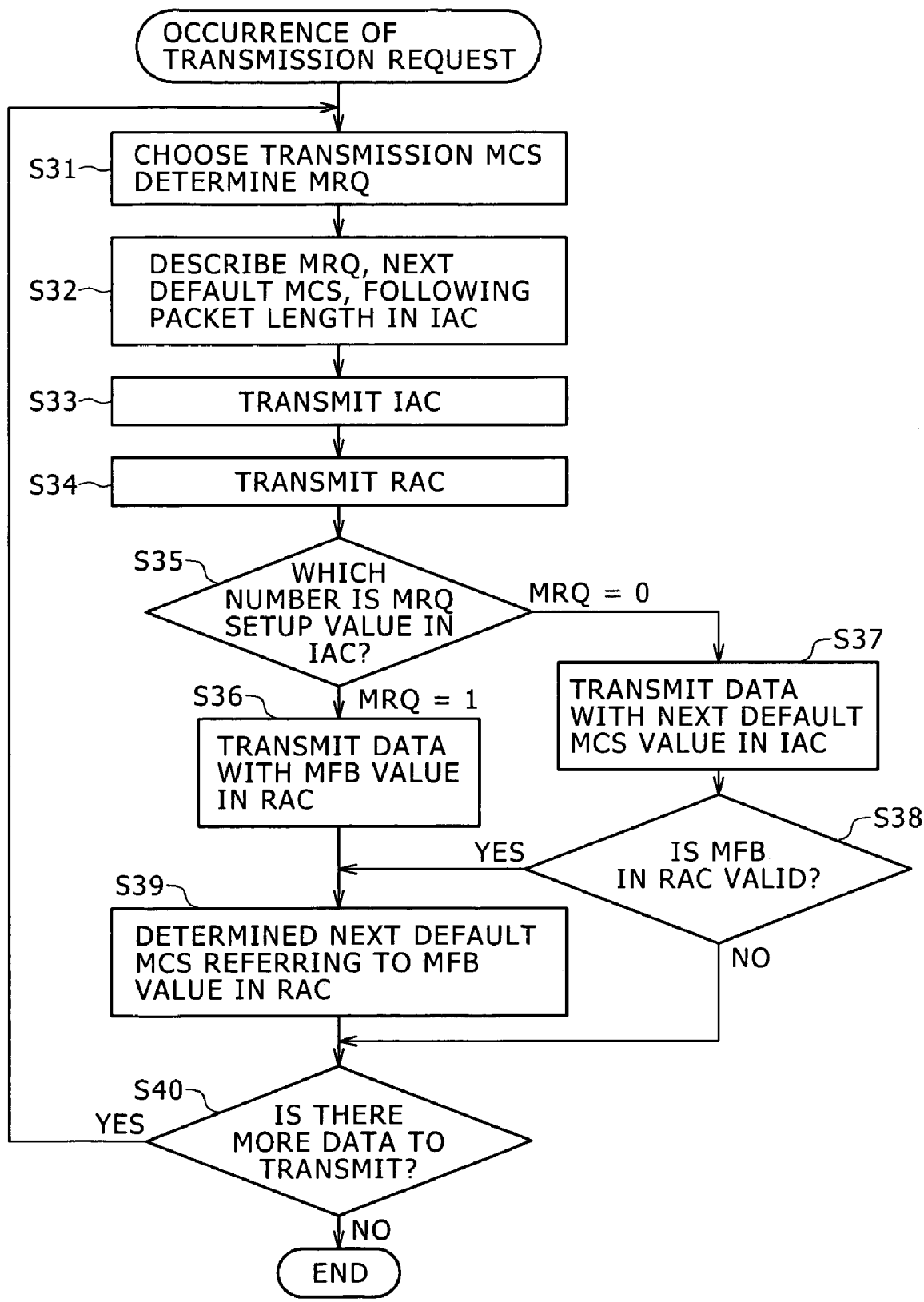
FIG. 8 is a flowchart showing processing operations by the transmission station for realizing the MRQ/MFB handshake operation shown in FIG. 7 in the third MRQ mode.

FIG. 8 shows a processing operation of the transmission station in the case of realizing the MRQ/MFB handshake operation shown in FIG. 7 in the form of a flow chart. This processing operation is realized in the form such that the central control section 103 executes an execution instruction program read from the information storage section 113.

When a transmission request occurs from the upper layer of the communication protocol, the transmission station chooses a transmission rate MCS (transmission rate) used at the time of data packet transmission and determines a policy of the MRQ mode (that is, which one of the transmitting and the reception stations is allowed to have the final determination right of a transmission rate) (Step S31).

Then, the transmission station generates the IAC packet corresponding to the RTS in which an MRQ value and Next Default MCS (transmission rate) determined in the FPD and Following Packet Length (Step S32), and transmits this to the reception station (Step S33).

The reception station that received the IAC packet sends back the RAC packet corresponding to the CTS. When the transmission station received the RAC packet (Step S34), the transmission station performs transmission processing of the next data packet depending on an MRQ mode being set in the IAC (Step S35).

If MRQ=1 is setup, the transmission station transmits a data packet at Receive MCS (transmission rate) described as the MFB in the RAC packet (Step S36).

On the other hand, if MRQ=0 is set up, since the transmission station itself has the final determination right of a transmission rate, the transmission station transmit a data packet at Default MCS (transmission rate) described in the FPD of the IAC packet (Step S37). However, since the reception station is allowed to feed back MCS (transmission rate) that is recommended, the transmission station checks whether a valid MFB is described in the RAC packet (Step S38).

Then, the transmission station determines Next Default MCS (transmission rate) for a data packet being transmitted subsequently after next, referring to the MFB outputted from the RAC packet in Step S36 and Step S38 (Step S39).

After that, if there is more data to transmit, the flow returns to Step S31 and repeats the same processing operation as described above (Step S40).

Figure 9:
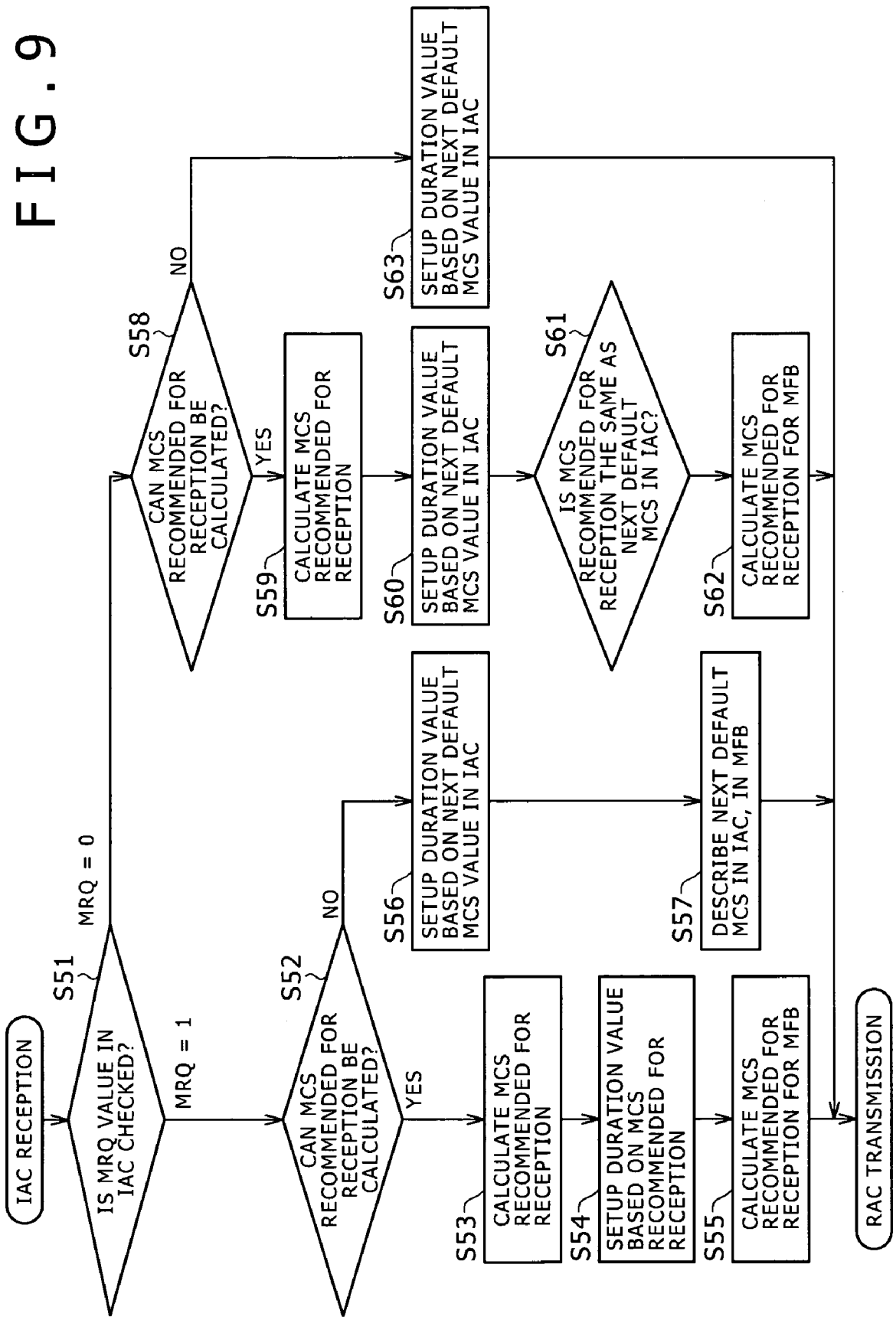
FIG. 9 is a flowchart showing processing operations by the reception station for realizing the MRQ/MFB handshake operation shown in FIG. 7 in the third MRQ mode.

FIG. 9 shows a processing operation of the receiving side for realizing the MRQ/MFB handshake operation shown in FIG. 7 in the third MRQ mode in the form of a flowchart. This processing operation is realized in the form such that the central control section 103 executes an execution instruction program read from the information storage section 113.

When the reception station received the IAC packet destined to the local station, the reception station checks an MRQ value described in the FPD (Step S51).

Here, if the received IAC packet has a description of MRQ=1 in it, the reception station is led to recognize that the next data packet will be transmitted at the recommended MCS (transmission rate) fed back from the local station. Then, the reception station checks whether it is possible to calculate an optimum MCS (transmission rate) at which the local station performs reception (Step S52).

If the local station is in a mode capable of calculating an optimum MCS (transmission rate), the reception station calculates an MCS (transmission rate) that is recommended to be used at the time of data packet reception (Step S53). Moreover, since the transmission station will send the next data packet using the recommended MCS (transmission rate) instead of Default MCS (transmission rate), the reception station is available for fixing Duration at this point. Then, the reception station calculates a time necessary to receive a data packet being subsequently transmitted, i.e., the Duration value, based on Next Packet Length and the recommended MCS (transmission rate) thus calculated, and describes it in the MAC header of the RAC packet (Step S54). Then, the recommended MCS (transmission rate) is described in the MFB of the RAC packet (Step S55).

On the other hand, if although MRQ=1 is described in the IAC packet, the reception station is in a mode not capable of calculating an optimum MCS (transmission rate) (Step S52), the reception station calculates a time necessary to receive a data packet being subsequently transmitted, namely Duration value, based on Next Packet Length and Next Default MCS (transmission rate) described in the IAC packet, and describes it in the MAC header of the RAC packet (Step S56). Moreover, the reception station copies Default MCS (transmission rate) specified in the IAC to the MFB of the RAC packet (Step S57).

On the other hand, if MRQ= is described in the received IAC packet (Step S51), the reception station is led to recognize that, although the transmission station retains the final determination right, the reception station is allowed to recommend an MCS (transmission rate). Then, the reception station checks whether an optimum MCS (transmission rate) at which the local station performs reception data is calculable (Step S58).

If the reception station is in a mode capable of calculating an optimum MCS (transmission rate), the reception station calculates an MCS (transmission rate) that is recommended to be used at the time of data packet reception (Step S59). Since in a data packet being subsequently transmitted the transmission station uses Default MCS (transmission rate) that was declared in the IAC, the reception station calculates a time necessary to receive the data packet being subsequently transmitted based on Next Packet Length and Default MCS (transmission rate), and describes the value as Duration in the MAC header of the RAC packet (Step S60). Then the reception station compares the recommended MCS (transmission rate) calculated in Step S59 and Default MCS (transmission rate) described in the IAC packet (Step S61), and only if the both rates are different, the reception station describes the recommendation MCS (transmission rate) in the MFB of the RAC packet (Step S62)

However, the reception station may be designed to perform feedback if the both rates are found the same as a result of comparison, and this particular design causes no problem.

If MRQ=0 is described in the IAC packet, indicating that the reception station is in a mode where an optimum MCS (transmission rate) is not calculable (Step S58), the reception station calculates Duration value that is a time necessary to receive a data packet being subsequently transmitted, based on Next Packet Length and Next Default MCS (transmission rate) described in the IAC packet and describe it in the MAC header of the RAC packet (Step S63). In this case, the MFB is not described and feed back of the MCS (transmission rate) is not performed.

Then, the reception station sends back the RAC packet generated by the above-mentioned processing to the transmission station, and stands by in order to receive a data packet being subsequently transmitted.

As explained in the foregoing, by the MRQ/MFB handshake operation using the IAC/RAC procedure, while the transmission station has the determination right of a transmission rate, it is possible for the transmission station to receive a feedback of a transmission rate recommend by the receiving-side communication station, choose a proper transmission rate, and transmit information at that transmission rate. It is expected for those who read this description to understand fully that a determination algorithm of a transmission rate between the transmitting/reception stations has three kinds of MRQ modes in terms of determination right of a transmission rate, and a system using this algorithm is more flexible than a system that stipulates only the first and the second MRQ modes.

This invention was described in detail, referring to specific embodiments above. However, it is obvious that those who skilled in the art can accomplish modification and substitution of the embodiments without diverting from the scope and spirits this invention.

Although this description has explained the invention assuming a wireless communication system in which each communication station operating autonomously and in decentralized manner makes a random access, similarly this invention can also be applied to a wireless communication system for performing transmission control that uses a channel resources by a MAC frame having a mild time division multiplexing access structure and wireless communication systems of other forms.

It should be understood by those skilled in the art that various modifications, combinations, sub-combinations and alterations may occur depending on design requirements and other factors in so far as they are within the scope of the appended claims or the equivalents thereof.

What is claimed is:

1. A wireless communication system having communication stations that select a transmission rate in a communication environment where a plurality of transmission rates coexist, the system comprising:
   a transmission station configured to transmit a transmission request packet to determine a transmission rate for transmitting a current data packet, the transmission station being set to one communication mode among:
      a first mode in which the transmission station transmits the current data packet at a transmission rate fed back from a reception station,
      a second mode in which the transmission station transmits the current data packet at a transmission rate determined independently of the fed back transmission rate, and a third mode in which the transmission station transmits the current data packet at a default transmission rate and sets a transmission rate for a subsequent data packet to the fed back transmission rate; and a reception station configured to:
determine to which communication mode the transmission station is set,
when the transmission station is set to the first mode, feed back to the transmission station a transmission rate for transmitting the current data packet and set peripheral stations to delay transmission for a duration based on the fed back transmission rate,
when the transmission station is set to the second mode, set the peripheral stations to delay transmission for a duration based on the independently determined transmission rate, and
when the transmission station is set to the third mode, feed back to the transmission station a transmission rate for transmitting the current data packet and set the peripheral stations to delay transmission for a duration based on the default transmission rate.

2. The wireless communication system according to claim 1, wherein:
the transmission station sets the default transmission rate and the communication mode, and transmits the transmission request packet to the reception station, the transmission request packet specifying a size of the current data packet, the default transmission rate, and the set communication mode, and
the reception station determines whether to feed back to the transmission station a transmission rate based on the communication mode specified by the transmission request packet, sets the peripheral stations to delay transmission for a duration based on the default transmission rate, and transmits an acknowledgment to the transmission station.

3. The wireless communication system according to claim 2, wherein:
when the transmission station is set to the first mode, the reception station feeds back to the transmission station a recommended transmission rate for transmitting the current data packet in an acknowledgment packet, and sets the peripheral stations to delay transmission for a duration based on the recommended transmission rate, and
the transmission station transmits the current data packet at the recommended transmission rate fed back from the reception station.

4. The wireless communication system according to claim 2, wherein:
when the transmission station is set to the second mode, the reception station sets the peripheral stations to delay transmission for a duration based on the default transmission rate specified by the transmission request packet, and
the transmission station transmits the current data packet at the default transmission rate.

5. The wireless communication system according to claim 2, wherein:
when the transmission station is set to the third mode, the reception station feeds back to the transmission station a recommended transmission rate for transmitting the current data packet via an acknowledgment packet, and sets the peripheral stations to delay transmission for a duration based on the default transmission rate specified by the transmission request packet, and
the transmission station determines a transmission rate for transmitting the subsequent data packet based on the recommended transmission rate fed back from the reception station, and transmits the current data packet at the default transmission rate.

6. A transmission station for setting a transmission rate in a communication environment where a plurality of transmission rates coexist, the transmission station comprising:
a packet generation section for generating a transmission request packet;
a packet analysis section for analyzing a received acknowledgement packet; and
a control section for controlling communication operations, the control section setting the transmission station to one communication mode among:
a first mode in which a transmission rate for transmitting a current data packet is set to a transmission rate fed back from a reception station,
a second mode in which a transmission rate for transmitting the current data packet is set to a transmission rate determined independently of the fed back transmission rate, and
a third mode in which a transmission rate for transmitting a subsequent data packet is set to the fed back transmission rate;
wherein:
in the first mode, the control section transmits the current data packet at a recommended transmission rate fed back from the reception station,
in the second mode, the control section transmits the current data packet at a default transmission rate reqardless of the recommended transmission rate fed back from the reception station, and
in the third mode, the control section transmits the subsequent data packet at the recommended transmission rate fed back from the reception station, and transmits the current data packet at the default transmission rate.

7. The transmission station according to claim 6, wherein the control section determines a transmission rate for the subsequent data packet based on at least one of the fed back transmission rate, a significance of data contained in the subsequent data packet, and power consumption at the time of transmission.

8. The transmission station according to claim 6, wherein the control section specifies, in the transmission request packet, the default transmission rate and the communication mode for transmitting the current data packet.

9. The transmission station according to claim 8, wherein the control section specifies one of the first to third communication modes in the transmission request packet.

10. The transmission station according to claim 8, wherein:
the control section specifies the first mode or the second mode in the transmission request packet, and
when a transmission rate is fed back after specifying the second mode, the control section sets a transmission rate for transmitting the subsequent data packet to the fed back transmission rate and transmits the current data packet at the default transmission rate in accordance with the third mode.

11. The transmission station according to claim 6, wherein:
the control section configures the transmission station for transmitting the current data packet at the default transmission rate and for a corresponding transmission mode, and
transmits the transmission request packet to the reception station, the transmission request packet specifying a size of the current data packet and the default transmission rate for the current data packet.

12. A reception station for setting a transmission rate in a communication environment where a plurality of transmission rates coexist, the reception station comprising:
- a packet generation section for generating an acknowledgement packet;
- a packet analysis section for analyzing a received transmission request packet; and
- a control section for controlling communication operations, the control section being configured to determine a communication mode of a transmission station from among:
  - a first mode in which the transmission station transmits a current data packet at a transmission rate fed back from the reception station,
  - a second mode in which the transmission station transmits the current data packet at a transmission rate determined independently of the fed back transmission rate, and
  - a third mode in which the transmission station sets a transmission rate for a subsequent data packet to the fed back transmission rate and transmits the current data packet at a default transmission rate,
- wherein the control section is further configured to:
  - in the first mode, feed back to the transmission station a transmission rate for transmitting the current data packet, and set peripheral stations to delay transmission for a duration based on the fed back transmission rate;
  - in the second mode, set peripheral stations to delay transmission for a duration based on the transmission rate independently determined by the transmission station; and
  - in the third mode, feed back to the transmission station a transmission rate for transmitting the current data packet, and set the peripheral stations to delay transmission for a duration based on the default transmission rate.

13. The reception station according to claim 12, wherein:
- the packet analysis section receives a transmission request packet from the transmission station, the transmission request packet specifying the default transmission rate and the communication mode for transmitting the current data packet, and
- the control section is further configured to control a data reception operation based on the communication mode specified by the transmission request packet.

14. The reception station according to claim 13, wherein the control section is further configured to feed back a transmission rate when the second mode is specified by the transmission request packet.

15. The reception station according to claim 12, wherein:
- the packet analysis section receives a transmission request packet from the transmission station, the transmission request packet specifying the default transmission rate, the communication mode for transmitting the current data packet, and a size of the current data packet, and
- the control section is further configured to:
  - determine whether to feed back to the transmission station a transmission rate based on the communication mode specified in the transmission request packet,
  - set the peripheral stations to delay transmission for a duration based on the default transmission rate specified by the transmission request packet, and
  - transmit an acknowledgment packet to the transmission station.

16. The reception station according to claim 15, wherein when the transmission request packet specifies the first mode, the control section is configured to:
- feed back to the transmission station a recommended transmission rate for transmitting the current data packet via the acknowledgment packet, and
- set the peripheral stations to delay transmission for a duration based on the recommended transmission rate specified in the transmission request packet.

17. The reception station according to claim 15, wherein when the transmission request packet specifies the second mode, the control section is configured to set the peripheral stations to delay transmission for a duration based on the default transmission rate specified by the transmission request packet.

18. The reception station according to claim 15, wherein when the transmission request packet specifies the third mode, the control section is configured to:
- feed back to the transmission station a recommended transmission rate for transmitting the current data packet via an acknowledgment packet, and
- set the peripheral stations to delay transmission for a duration based on the default transmission rate specified by the transmission request packet.

19. A method performed by a transmission station for setting a transmission rate in a communication environment where a plurality of transmission rates coexist, the method comprising:
- setting the transmission station to one communication mode among:
  - a first mode in which the transmission station transmits a current data packet at a transmission rate fed back from a reception station,
  - a second mode in which the transmission station transmits the current data packet at a transmission rate determined independently of the fed back transmission rate, and
  - a third mode in which the transmission station sets a transmission rate for transmitting a subsequent data packet to the fed back transmission rate and transmits the current data packet at a default transmission rate; and
- transmitting the current data packet at a transmission rate determined based on the set communication mode and the fed back transmission rate.

20. A method performed by a reception station for setting a transmission rate in a communication environment where a plurality of transmission rates coexist, the method comprising:
- determining to which communication mode a transmission station is set from among:
  - a first mode in which the transmission station transmits a current data packet at a transmission rate fed back from the reception station,
  - a second mode in which the transmission station transmits the current data packet at a transmission rate determined independently of the fed back transmission rate, and
  - a third mode in which the transmission station sets a transmission rate for transmitting a subsequent data packet to the fed back transmission rate and transmits the current data packet at a default transmission rate;
- when the transmission station is set to the first mode, feeding back to the transmission station a recommended transmission rate for transmitting the current data packet and setting peripheral stations to delay transmission for a duration based on the recommended transmission rate;

when the transmission station is set to the second mode, setting the peripheral stations to delay transmission for a duration based on the transmission rate independently determined by the transmission station; and when the transmission station is set to the third mode, feeding back to the transmission station a recommended transmission rate for transmitting the subsequent data packet and setting the peripheral stations to delay transmission for a duration based on the default transmission rate.

* * * * *